United States Patent
Christmann et al.

(10) Patent No.: US 9,322,899 B2
(45) Date of Patent: Apr. 26, 2016

(54) METHOD AND SYSTEM FOR LOCATING A CURRENT POSITION OR A COUPLING LOCATION OF A MOBILE UNIT USING A LEAKY WAVEGUIDE

(75) Inventors: Mark Christmann, Munich (DE); Peter Gulden, Munich (DE)

(73) Assignee: SYMEO GMBH (DE)

( * ) Notice: Subject to any disclaimer, the term of this patent is extended or adjusted under 35 U.S.C. 154(b) by 105 days.

(21) Appl. No.: 14/232,561

(22) PCT Filed: Jul. 13, 2012

(86) PCT No.: PCT/DE2012/000726
§ 371 (c)(1),
(2), (4) Date: Jan. 13, 2014

(87) PCT Pub. No.: WO2013/007245
PCT Pub. Date: Jan. 17, 2013

(65) Prior Publication Data
US 2014/0171113 A1    Jun. 19, 2014

(30) Foreign Application Priority Data

Jul. 13, 2011    (DE) .................. 10 2011 107 164

(51) Int. Cl.
*H04W 24/00* (2009.01)
*G01S 5/00* (2006.01)
(Continued)

(52) U.S. Cl.
CPC ................. *G01S 5/0009* (2013.01); *G01S 5/06* (2013.01); *H04W 56/004* (2013.01)

(58) Field of Classification Search
CPC ....... G01S 5/0009; G01S 5/06; H04W 56/004
USPC ................. 455/456.1, 129, 121, 269
See application file for complete search history.

(56) References Cited

U.S. PATENT DOCUMENTS

| 4,041,495 A | 8/1977 | Martin |
| 7,594,133 B2 | 9/2009 | Vossiek |

(Continued)

FOREIGN PATENT DOCUMENTS

| DE | 10157931 C2 | 6/2003 |
| DE | 102007037723 A1 | 2/2009 |

(Continued)

OTHER PUBLICATIONS

Search Report from German Patent and Trademark Office (with English translation), issued in related application DE102011107164.8, dated Jul. 13, 2011, 8 pages.

(Continued)

*Primary Examiner* — Mong-Thuy Tran
(74) *Attorney, Agent, or Firm* — Young Basile Hanlon & MacFarlane (57) ABSTRACT

A method and related system are provided for locating a current position or a coupling location of a mobile unit, which can send or receive for location determining purposes, using a leaky waveguide, wherein a radio signal is fed from the mobile unit into the waveguide or vice versa, wherein the signal is sent by the mobile unit and received by the two transmitting and receiving (T/R) apparatuses, or one signal is sent by each of the two T/R apparatuses and received by the mobile unit, wherein a receiving time is determined for each received signal, and the current position or the coupling location is determined from two such receiving times. The T/R apparatuses, arranged at opposite ends of the waveguide, are synchronized relative to each other prior to the determination of the current position or coupling location, or prior to the reception of the signal.

15 Claims, 2 Drawing Sheets

(51) Int. Cl.
*G01S 5/06* (2006.01)
*H04W 56/00* (2009.01)

(56) References Cited

U.S. PATENT DOCUMENTS

| | | | |
|---|---|---|---|
| 7,940,743 B2 | 5/2011 | Seisenberger et al. | |
| 2004/0210350 A1 | 10/2004 | Rao et al. | |
| 2004/0260506 A1 | 12/2004 | Jones et al. | |
| 2006/0014548 A1* | 1/2006 | Bolin et al. | 455/456.1 |
| 2007/0285233 A1* | 12/2007 | Inomata et al. | 340/552 |
| 2008/0002864 A1 | 1/2008 | Das et al. | |
| 2009/0140852 A1* | 6/2009 | Stolarczyk et al. | 340/539.13 |
| 2010/0253532 A1 | 10/2010 | Pernisek et al. | |
| 2010/0273504 A1* | 10/2010 | Bull et al. | 455/456.1 |

FOREIGN PATENT DOCUMENTS

| | | | | |
|---|---|---|---|---|
| DE | WO 2009/018815 | * | 2/2009 | G01S 13/00 |
| WO | 9407222 A1 | | 3/1994 | |
| WO | 9428432 A1 | | 12/1994 | |

OTHER PUBLICATIONS

"Two Dimensional Position Detection Method Using Bi-Directional Leaky Coaxial Cable Based on TDOA", Nishikawa, et al.; IEEE 20th Int. Symposium on Personal, Indoor and Mobile Radio Communications, Sep. 13-16, 2009, pp. 2167-2170.

"Wireless Local Positioning", Vossiek et al.; IEEE Microwave Magazine, Dec. 2003, vol. 4, Issue 4, pp. 77-86.

* cited by examiner

METHOD AND SYSTEM FOR LOCATING A CURRENT POSITION OR A COUPLING LOCATION OF A MOBILE UNIT USING A LEAKY WAVEGUIDE

CROSS REFERENCE TO RELATED APPLICATIONS

This application is the U.S. national phase of the International Patent Application No. PCT/DE2012/000726, filed Jul. 13, 2012, which claims the priority benefit of German Patent Application No. 10 2011 107 164.8, filed Jul. 13, 2011, herein incorporated by reference.

BACKGROUND

Described herein is a method and system for locating a current position and a coupling location of a mobile unit by way of a leaky waveguide.

In communication technology, there is a problem of reliable communication and moreover the problem of locating transmitters borne by persons or vehicles in tunnels, such as in the transport of personnel, in the construction of tunnels or in underground mining.

In this field, special devices are used for sending and receiving, such as slit or leaky waveguides as cables, are used for communication with mobile phones, for example. Such leaky waveguides are in effect coaxial cables provided with slits in the shielding area. Depending on the propagation direction, an electromagnetic wave is coupled into the air or into the cable through these slits. Due to the long extension of the cable and the coupling mechanism, this is a complex process in the near field of the antenna, i.e. the transition cannot be easily simulated and is not to be approximated by the usual remote-field approximation processes.

This is why the well-known attempts to locate radio transmitters by way of determining their field strengths or their field strength decay, remain extremely imprecise. Such an attempt is known, for example, from [Weber] Weber et al., "Indoor RF Fingerprinting using leaky feeder cable considering environmental changes", Proceedings of ACM Mobility Conference 2009, Sep. 2-4, 2009, Nice, France. Moreover, the essential portion of the power decay and the power fluctuation occurs over the distance between the radio unit and the cable, in an amount of 30-70 dB for example, and the power decay along the cable is very small, at 1.5 dB/m, for example. This is why even small variations in field strength substantially falsify the result.

Apart from measuring the field strength, a propagation delay can also be measured. It is, however, technically complex to measure it along the leaky waveguide. If, for example, the distance to one side is measured by way of round-trip measurement (round-trip time-of-flight), it will include both the propagation delay through the air and the propagation delay along the cable. Measuring the distance to one end and then to the other in a sequential manner is principally possible, it needs precise tuning of the measuring time slots, however, doubles communication overhead and is exceedingly error prone due to the sequential measurement and the rapidly varying radio channel. A further disadvantage is the necessity of two-way communication, because it is technically more complex, and also the maximum possible measuring rate is reduced as the number of mobile units increases.

Nishikawa et al, "A new position detection method using Leaky Coaxial Cable", IEICE Electronics Express, vol. 5, no. 8, pp. 285-290, 2008, describes, for example, an arrangement and a method for determining the position of a receiver, in which a leaky waveguide is used. The leaky waveguide comprises sequential groups of slits, wherein the slits of the one group are inclined in one direction and the slits of the other group are inclined in the opposite direction. The receiver directly receives a signal fed into one end of the leaky waveguide and at a later time the same signal after it has been reflected at the other end of the leaky waveguide. The difference in time between the directly received signal and the reflected received signal is determined by the receiver. The method used cannot be implemented in practice, however, due to the high dynamic differences and the interference of the communication by the termination, in particular so-called intersymbol interference.

Such a configuration by way of a faulty termination of the second cable end and the determination of the distance from the difference of the two echoes involves substantial technical drawbacks. Due to the great dynamic difference of the two signals, they cannot be safely distinguished. Moreover, the signals overlap each other during location near the unadapted cable end and cannot be resolved, which means that position determination is not possible there. A further drawback is that when the cable is simultaneously used for communication, it is substantially interfered with due to reflections at the loose end, such as by the occurrence of intersymbol interference (ISI). The above mentioned drawbacks of the necessary two-way communication, such as measuring rate, technical complexity, also remain valid.

In a different technical field, such as the location of vehicles in large hangars and in logistic centers, a method for synchronizing clock devices is known, from U.S. Pat. No. 7,594,133 B2 [Sym06], in which a transmitting unit sends at least one narrow-band pre-signal, clock devices of receiving units are pre-synchronized by receiving units by coupling onto such pre-signal of the source of the pre-signal, the transmitting unit sends a broad-band measuring signal after a certain waiting period and the receiving units receive the signal, the receiving units correlate the broad-band measuring signal with a comparison signal modulated in the same way and, based on the correlation result, the receiving time of the broad-band measuring signal is determined and the deviation of the synchronization of the clock devices is determined and compensated. Such existing radio-location determining methods must be realized with high technical overhead for the infrastructure, such as a great number of stationary reference units, due to propagation conditions, such as reflection, shading and propagation delay spread, and are thus not widely used outside of the field of large hangars and logistic centers, for example. Location determining transmitters borne by persons and vehicles in tunnels, for example in the construction of tunnels or in underground mining is thus also a problem which is technically challenging.

In this technical field, which is extraneous to the field of communication technology, a method is known from German Patent No. DE 101 57 931 C2, or U.S. Pat. No. 7,940,743 B2 [Sym16] for synchronizing radio stations with respect to each other and a time-synchronous bus system. A transmitter station and a receiver station communicate through an interface, wherein a transmitting signal is generated in a transmitter station by way of a signal source, and sent through the interface, and wherein a corresponding receiving signal is received by the interface in the receiver station. To synchronize the transmitter station and receiver station, a receiver signal-source signal is evaluated by a receiver-side signal source tuned to the sender-side signal source. The same frequency modulation is applied to both the transmitting signal and the receiver signal-source signal. The receiving signal received in the receiver station is mixed with the receiver signal-source signal to create a mixed signal, and the mixed signal is spectrally analyzed. Again, this method has been developed, in particular, for the field of location determining vehicles and goods in large hangars and in logistic centers.

SUMMARY

It is therefore the object of various embodiments of the present invention to improve a method and a system with its components for locating a current position or a coupling location of a mobile unit by way of a leaky waveguide. In particular, position determination is to be facilitated with simpler means in a more precise and reliable manner.

The object is achieved by the method for locating a current position or a coupling location of a mobile unit by way of a leaky waveguide including the features described below, or the system for locating a current position or a coupling location of a mobile unit by way of a leaky waveguide including the features of described below. Advantageous embodiments are the subject matter of dependent claims.

Thus, a method for locating a current position or a coupling location of a mobile unit is preferred, in particular, which is at least able to send or receive for location determining purposes, by way of a leaky waveguide, wherein at least one radio signal is transmittable from the mobile unit into the leaky waveguide or from the leaky waveguide to the mobile unit, in particular through leaky portions of the leaky waveguide. The radio signal is transmitted by the mobile unit and received by the two transmitting and receiving apparatuses, or such a radio signal is sent by each of the two transmitting and receiving apparatuses and received by the mobile unit. A receiving time is determined for each of the received radio signals, and from two such receiving times the current position or the coupling location is determined, wherein prior to the determination of the current position or the coupling location or prior to receiving the radio signal or prior to transmitting the radio signal, the transmitting and receiving apparatuses located at the opposite ends of the leaky waveguide are synchronized with each other.

The word "or" comprises, in particular, the variant "and".

For the mobile unit to be located, it is sufficient that it is able to send or receive. For the case that the mobile unit is only able to send, it is sufficient for it to be located if the two transmitting and receiving apparatuses, synchronized in advance or hereafter, can receive and evaluate the radio signal received from the mobile unit and forwarded by the leaky waveguide.

The mobile unit comprises, in particular, an antenna for sending or receiving the radio signal across an air gap, while the two transmitting and receiving apparatuses are connected, in particular, by way of cables to the opposite ends of the leaky waveguide.

It is thus also sufficient, if a mobile unit, able to receive, receives two time stamps sent by the two transmitting and receiving apparatuses, synchronized with each other beforehand, comprising timing information sufficiently unique for the mobile unit to derive its own spatial position therefrom. The timing information can be sent by the transmitting and receiving apparatuses as such, or can also be sent as other signals sufficiently identifiable for the mobile unit, for example, at sending conditions well known to the mobile unit. The receiving times will be those within the mobile unit, which correspond to further processable time stamps. As an alternative to the sending of the time stamps, it is also possible to transmit correction data.

Depending on the configuration and in dependence on the knowledge of further data, as the case may be, the spatial position of the mobile unit to be located can be determinable on an absolute basis or only relative to the leaky waveguide.

Synchronization is preferably done prior to receiving the radio signal from the mobile unit, or prior to transmitting a time determination signal to the mobile unit. Synchronization can also be done, however, after receiving the radio signal from the mobile unit, if a synchronization is carried out afterwards and any time difference determined during synchronization is used to adjust the receiving times to perform subsequent determination of the current position or the coupling location on the basis of the adapted receiving times.

The radio signal is received or sent by at least two from the group of the transmitting and receiving apparatuses and the mobile unit 3. This is to be understood, in particular, as the variant where the radio signal is sent by the mobile unit and received by the two transmitting and receiving apparatuses.

The radio signal can also be sent by the two transmitting and receiving apparatuses and received as two signals by the mobile unit, which then performs determination of its own position or which transmits the correspondingly determined receiving times to a different, and remote, as the case may be, independent apparatus for further evaluation and location determining. Further configurations facilitate sending by one of the two transmitting and receiving apparatuses and receiving by the mobile unit and by the other one of the two transmitting and receiving apparatuses. Delayed sending is also possible, wherein one transmitting and receiving apparatus sends the radio signal before the other one, for example, wherein the time difference of the mobile unit is known or communicated. The time difference can be large enough for the two radio signals of the two transmitting and receiving apparatuses not to overlap.

Unlike the functioning principle of systems according to, for example, [Sym06] or [Sym16], instead of synchronization, location determining and ranging, in the wide open free space, only the two transmitting and receiving apparatuses are synchronized with respect to each other, while the location determining or the ranging of the mobile unit can optionally also occur by way of a different system while using the leaky waveguide or exclusively by using the leaky waveguide system. Existing systems, such as broadcast or mobile radio communication systems based on leaky waveguides, for example, in tunnels can be simply complemented with a precise or improved location determining functionality by way of the synchronization technology.

In the present case, the radio signal is a signal propagating from the conductor of the leaky waveguide through its leaky locations in the form of, for example, slits, at the coupling location and across an air gap to an antenna of the mobile unit or in the reverse direction. The radio signal also comprises, in particular, a distance extending from the slit or the coupling location through the conductor of the leaky waveguide to the two transmitting and receiving apparatuses.

A method is also possible, in which for synchronizing of at least two of the transmitting and receiving apparatuses, which each have an own clock device, one of the transmitting and receiving apparatuses is determined as a transmitter station and the other, to be synchronized with the former, is determined as a receiver station, wherein for synchronizing the clock devices and thus the transmitting and receiving apparatuses to be synchronized, the transmitter station sends at least one narrow-band pre-signal through the leaky waveguide, clock devices of receiving units of the receiver station are pre-synchronized with the source of the pre-signal by coupling onto such pre-signal, wherein after a specific waiting period, the transmitter station sends a broadband measuring signal through the leaky waveguide and the receiving units receive this signal, the receiving units correlate the broadband measuring signal with a comparison signal modulated in the same way, and based on the correlation result, the receiving time of the broadband measuring signal is determined and the deviation of the synchronization of the clock devices is determined and compensated.

In such methods, for synchronizing, one of the transmitting and receiving apparatuses can be determined as transmitter station and the other as receiver station to be synchronized therewith, wherein, in the transmitter station, a transmission signal is generated by a signal source and is sent through the leaky waveguide, and a corresponding receiving signal is received in the receiver station by the leaky waveguide and evaluated by a receiver-side signal source adapted to the transmitter-side signal source by using a receiver signal-source signal in the receiver station, a similar frequency modulation is applied to both the transmission signal and the receiver signal-source signal, wherein the receiving signal received in the receiver station is correlated, or is mixed with the receiver signal-source signal to create a mixed signal and the mixed signal is spectrally analyzed.

For synchronization in such configurations, in particular, the mobile unit can send any signal form and frequency both for the purpose of communication and for the purpose of location.

In particular, the same or similar transmission signals are used on the one hand for the synchronization of the transmitting and receiving apparatuses and, on the other hand, for location determining and/or for the communication of the mobile unit. Such an approach facilitates the use of only a few and simply structured receiving and transmitting devices, in particular those in accordance with [Sym06] and [Sym16].

For synchronizing the two transmitting and receiving apparatuses with each other by way of the leaky waveguide, synchronization signals in a different frequency range—in particular a non-overlapping frequency range—can be sent as a frequency range in which the communication signals are sent by the leaky waveguide.

Such different frequency ranges for the synchronization signals on the one hand and for the communication signals on the other, can be in non-overlapping frequency ranges on a permanent basis. Configurations are also possible, however, in which the frequency ranges or the frequencies are only temporarily allocated. Hybrid forms are also possible, wherein individual ones of a plurality of individual frequency bands are used for communication signals, and other frequency ranges, frequencies or frequency bands, even interposed, as the case may be, are allocated and used for the synchronization signals.

Thus simultaneous and continuous synchronization and communication is facilitated by simple means, without having communication interfered by the synchronization process and vice versa.

Optionally, an air gap to the coupling location can also be determined as the coupling distance by using a propagation delay between the coupling location and the current position of the mobile unit.

A method is also possible, in which the radio signal is identifiable, in particular predefinable or predefined. A data sequence, an identification, a time slot, a frequency, a frequency sequence, a continuous wave with frequency width or modulation or a modulation scheme are used, for example. Such identification features are easily separable, in particular electronically.

This applies, in particular, to the mobile unit, so that the transmitting and receiving apparatuses can unequivocally identify its signal and can use its reception for determining the receiving time. In this way, the identification of a particular mobile unit from a plurality of mobile units to be located, or even just communicating mobile units, is also possible. According to simpler configurations, the receiving apparatuses only need to be able to receive the radio signal and to detect the receiving time. Sufficient detection capability to correlate the received radio signal or a part thereof, may be advantageous to increase precision, but is not absolutely necessary. In the most basic case, they do not have to understand the radio signal at all, but only need to recognize it as such.

Optionally, information with respect to active or detectable ones of such mobile units can be transmitted to the transmitting and receiving apparatuses, in particular via the leaky waveguide. One such information enables selective searching of the transmitting and receiving apparatuses for mobile units to be detected, so that their radio signals can be selectively detected among a plurality of signals passing through the leaky waveguide, enabling processing overhead to be reduced to those data or signals that actually need processing. Such information can be sent, for example, from a central control or maintenance center.

A system for locating a current position or a coupling location of at least one mobile unit present in the system or able to be introduced into the system, by way of a leaky waveguide, is also independently preferred, wherein such mobile units are at least able to send or receive for location determining purposes. Herein, the system comprises one said leaky waveguide into which at least one radio signal is transmittable from one said mobile unit, or from which at least one radio signal is transmittable to one said mobile unit through leaky portions of the leaky waveguide, two transmitting and receiving apparatuses arranged at opposite ends of the leaky waveguide for receiving or sending such a radio signal, wherein the radio signal is able to be sent by the mobile unit and able to be received by the two transmitting and receiving apparatuses, or such a radio signal is able to be transmitted by each of the two transmitting and receiving apparatuses and able to be received by the mobile unit, a receiving time is able to be determined for each of the radio signals received in such manner, and from two such receiving times, the current position or the coupling location is able to be determined, wherein prior to the determination of the current position or the coupling location or prior to receiving the radio signal or prior to sending the radio signal, the transmitting and receiving apparatuses are synchronized with each other, and wherein the system is provided with components for performing a method, described here, in particular, as a preferred method, for locating the current position or the coupling location of such a mobile unit.

Such components for performing the method can be distributed over a plurality of transmitting and receiving apparatuses and communication system apparatuses, or can be concentrated as far as possible in a few of such apparatuses. It is also possible to farm out a part of such functions in independent maintenance or control components.

The present is a system, in particular, wherein receiving devices are arranged differently, on the one hand for synchronizing the transmitting and receiving apparatuses and, on the other hand, for location determining and/or for the communication of the mobile unit, in particular arranged differently with respect to their functionality.

The receiving devices can be completely different with respect to their structure and/or functionality. It is sufficient if the transmitting and receiving apparatuses can be synchronized with a receiving device, and can receive radio signals of the mobile unit for location determining purposes with a receiving device, which is different or differently configured, in particular. According to other embodiments, it is also sufficient if the mobile unit can communicate with a receiving device through the leaky waveguide and can receive one radio signal from each of the two transmitting and receiving apparatuses for location determining purposes using a receiving device which is different or differently configured, in particular. This facilitates later extension of existing systems, in which only additional components and/or additional functionalities are implemented.

In one such system, one of the transmitting and receiving apparatuses can take over a communication function to coordinate location determining method steps.

Such a system can be configured in such a way that a communication system is complemented by location determining components or location determining functions, wherein the transmitting and receiving apparatuses and such a mobile unit and/or a communication transmitting and receiving apparatus of the communication system are operated with the same system clock, or are operated with almost the same system clock within a tolerance value. Due to the quasi-identical system clock, which is available in all modules, existing technical apparatuses for receiving signals can be used, whose system clock is predetermined by the synchronization devices. This reduces the development overhead.

A system is also possible, in which linking means for transmitting synchronization signals between the transmitting and receiving apparatuses are installed independent from the leaky waveguide. Transmission via a link, which can also be separate, for example, through an additional cable or via an air interface, is thus equivalent to the transmission of synchronization and response signals through the leaky waveguide. In this case, the cable length of the leaky waveguide is separately determined for the location determining computations. Moreover, the differences in signal propagation delay in the leaky waveguide and in the linking means independent from the leaky waveguide are determined by taking a time offset into consideration.

A transmitting and receiving apparatus for performing such a method or for operating such a system is also independently advantageous, which comprises components and/or functions for synchronizing one of the transmitting and receiving apparatus with another such transmitting and receiving apparatus or for synchronizing with another such transmitting and receiving apparatus, and components and/or functions for sending or receiving a radio signal through a leaky waveguide for locating a mobile unit.

Such a transmitting and receiving apparatus is advantageous, because it is suitable for retrofitting an existing communication system or location determining system and because it provides such communication or location determining system with a new or improved location determining capability. Configurations are also possible, in which existing transmitting and receiving apparatuses of extraneous location determining systems can be configured, in the most basic case, by installing software to perform a functionality suitable for the system, and can thus be used as additional location determining components in a communication system. A cable connection for connecting the conductor of the leaky waveguide is to be additionally formed, as the case may be, instead of an antenna for sending and receiving synchronization and location determining signals via an air interface.

A mobile unit for performing such a method or for operating such a system is also independently advantageous, which is provided with components and/or functions for sending or receiving a radio signal independent from communication signals for locating their current position or a coupling location of their signals into the leaky waveguide.

Such a mobile unit is independently advantageous, because it can be used in such a system for location determining purposes, in particular by simple retrofitting by way of software. This applies, in particular, to such embodiments, in which the mobile units only need to send a radio signal, which will be identified and processed as such by the transmitting and receiving apparatuses.

DESCRIPTION OF THE DRAWINGS

An exemplary embodiment will be described in more detail in the following with reference to the accompanying drawings, wherein.

DETAILED DESCRIPTION

Figure 1:
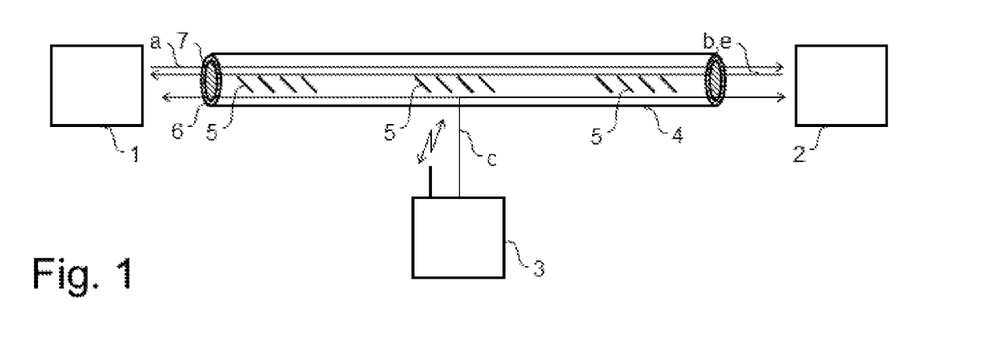
FIG. 1 is a system schematic of transmitting and receiving components along a leaky waveguide, and signal paths.

FIG. 1 shows two transmitting and receiving apparatuses 1, 2, a mobile unit 3 and a waveguide, in particular a so-called slit or leaky waveguide 4. The intention is to enable location determining one such mobile unit 3 by using the two transmitting and receiving apparatuses 1, 2 and the leaky waveguide 4, i.e. to determine the current spatial position of the mobile unit 3, in particular.

A first one of the two transmitting and receiving apparatuses 1 is arranged at a first end of the leaky waveguide 4 in such a way that an electromagnetic wave generated by the first transmitting and receiving apparatus 1 is fed into the leaky waveguide 4 and that an electromagnetic wave arriving through the leaky waveguide 4 is received by the first transmitting and receiving apparatus 1. The second one of the two transmitting and receiving apparatuses 2 is arranged at a second end opposite the first end of the leaky waveguide 4 in such a way that an electromagnetic wave generated by the second transmitting and receiving apparatus 2 is fed into the leaky waveguide 4 and that an electromagnetic wave arriving through the leaky waveguide 4 is received by the second transmitting and receiving apparatus 2. In this way, the second transmitting and receiving apparatus 2, for example, can synchronize to a signal sent by the first transmitting and receiving apparatus 1 that is received in the second transmitting and receiving apparatus 2.

The leaky waveguide 4 includes slits 5. A shielding 6 surrounds a conductor 7, or a cable, in such a way that electromagnetic waves cannot pass into the conductor 7 from the outside, or cannot pass from the conductor 7 to the outside. The slits 5 are formed in the shielding 6, or pass through the shielding 6 in such a way that electromagnetic waves passing through the conductor 7 exit through the slits 5 to the outside and that electromagnetic waves coming from the outside can enter into the conductor 7 through the slits 5. Such electromagnetic waves are signals, in particular, which are sent or received by the two transmitting and receiving apparatuses 1, 2 and by the mobile unit 3.

The two transmitting and receiving apparatuses 1, 2, used in combination, are configured and suitable to perform mutual synchronization of the two transmitting and receiving apparatuses 1, 2. The precision of synchronization is such that a subsequently described location of the mobile unit 3 is facilitated to a sufficient precision. The two transmitting and receiving apparatuses 1, 2 are configured in accordance with [Sym16] and suitable to perform a method for mutual synchronization described therein. The synchronization at least provides that one of the two transmitting and receiving apparatuses 1, 2 can be synchronized with the other.

Figure 2:
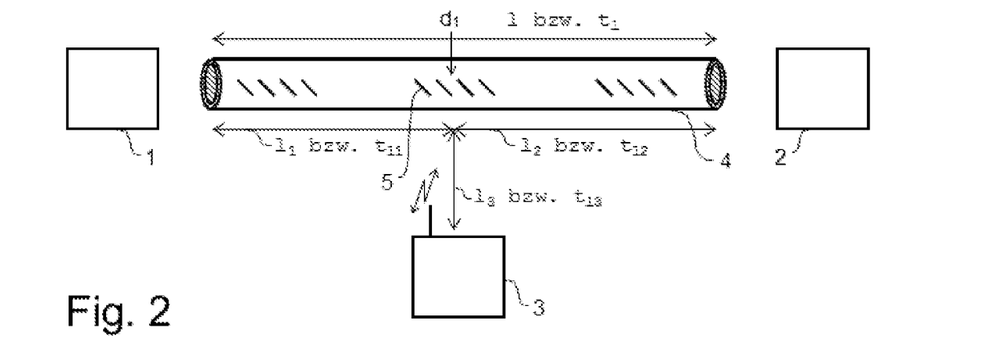
FIG. 2 shows lengths or distances in the air or as the length of an electric cable used for computation in such an arrangement.

The following method for location determining one such mobile unit along the leaky waveguide 4 is suggested:

According to FIGS. 1 and 2, each end of the cable or conductor 7 of leaky waveguide 4 is provided with one such combined transmitting and receiving apparatus 1, 2. In a first step, one of the two units, for example the first transmitting and receiving apparatus 1, transmits a synchronization signal a along the leaky waveguide 4. This synchronization signal a is received from the other one, the second transmitting and receiving apparatus 2, and is used for determining its own time and frequency offset, for example, in accordance with [Sym16]. If a signal propagation delay $t_1$ along the cable from the first to the second end of the conductor 7 is known, it is directly taken into consideration in the transmitting and receiving apparatus 2. Otherwise, the receiving transmitting and receiving apparatus 2 can send back a highly synchronous response signal b along the leaky waveguide 4, wherein the first transmitting and receiving apparatus 1 calculates the signal propagation delay $t_1$ along the leaky waveguide 4 from the response signal b. The two transmitting and receiving apparatuses 1, 2, or their stations, then exchange these data, i.e. in particular time and frequency offset and the signal propagation delay $t_1$ along the leaky waveguide 4, by way of communication. Alternatively, the two transmitting and receiving apparatuses 1, 2 alternately perform these measurements to obtain the signal propagation delay $t_1$ along the leaky waveguide 4 and other information necessary for synchronization.

In a next step, the mobile unit 3 now sends a radio signal c at a time which is used as a starting time $t_{start}$. This radio signal c of the mobile unit 3 couples in through the air at a location referred to as coupling location $d_1$, in particular one or more of the slits 5 in the leaky waveguide 4, and is received by the transmitting and receiving apparatuses 1, 2 at the waveguide ends. The receiving time is determined with high precision or with a level of precision necessary for location. Ideally, a receiving time is determined with a propagation delay precision of $\Delta t = \Delta d / c_{cable}$, i.e. the location determining precision $\Delta d$ divided by a propagation velocity in the cable or in the conductor $c_{cable}$. This leads to time stamping with time stamps $t_{stamp1}$, $t_{stamp2}$, in particular, for the receiving time at the first and second transmitting and receiving apparatus 1, 2. Each of the receiving times is determined, for example, by way of correlation.

Subsequently, there will be a time stamp exchange e. To do this, the two transmitting and receiving apparatuses 1, 2 exchange the receiving time, or the time stamps $t_{stamp1}$, $t_{stamp2}$, in particular in at least one direction. To ensure comparability of the time stamps $t_{stamp1}$, $t_{stamp2}$, time synchronization of the two transmitting and receiving apparatuses 1, 2 may have been performed beforehand or will be performed subsequently, to correct the time stamps $t_{stamp1}$, $t_{stamp2}$, to adjust them to a common time basis. Then the coupling location $d_1$, or the point, at which the signal was coupled into the leaky waveguide 4, is determined from the difference $\Delta t_{stamp}$ of the two receiving times. This is done, in particular according to $$t_{stamp1} = t_{start} + t_{l3} + t_{l1}, \quad (1)$$

$$t_{stamp2} = t_{start} + t_{l3} + t_{l2}, \quad (2)$$

$$\Delta t_{stamp} = t_{stamp1} - t_{stamp2} \quad (3)$$
$$= t_{l1} - t_{l2}$$
$$= 2t_{l1} - t_1, \text{ and}$$

$$t_{l1} = 0.5(\Delta t_{stamp} + t_1). \quad (4)$$

Herein, $t_{l1}$ is a propagation delay from or to the first transmitting and receiving apparatus 1 to the coupling location $d_1$, $t_{l2}$ is a propagation delay from or to the second transmitting and receiving apparatus 2 to the coupling location $d_1$, $t_{l3}$ is a propagation delay from or to the mobile unit 3 to the coupling location $d_1$, $l_1$ is a coupling distance or path of the coupling location $d_1$ along the leaky waveguide 4 as seen from the first transmitting and receiving apparatus 1, $l_2$ is a coupling distance or path of the coupling location $d_1$ along the leaky waveguide 4 as seen from the second transmitting and receiving apparatus 2, and $l_3$ is a coupling distance or path of the coupling location $d_1$ as seen from the mobile unit 3. For the coupling distance $l_1$, as seen from the first transmitting and receiving apparatus 1, we therefore get $$l_1 = 0.5(\Delta t_{stamp} + t_1) c_{cable} \quad (5)$$

wherein $c_{cable}$ is the known or measurable propagation velocity of a signal in the cable or conductor 7. The end points of the coupling distances $l_1$, $l_2$ and $l_3$, distant from the devices, or the corresponding propagation delays of a signal or a wave are all at the coupling location $d_1$.

It is particularly advantageous that due to the reception at both ends the resolution also considers small differences in distance. In particular, differences in distance below the propagation velocity within the cable $c_{cable}/(2.4*\Delta f)$ with $\Delta f$ as the bandwidth of the radio signal c can be resolved. Moreover, the communication signals are not interfered with, since there is no reflection at the loose end due to the connection of the two transmitting and receiving apparatuses 1, 2 at the ends of the leaky waveguide 4. Furthermore, a plurality of signals can be received and correlated simultaneously, so that a measuring rate does not have to be reduced as the number of the mobile units 3, communicating via the leaky waveguide 4 or to be located, is increased.

As an alternative to the sequence, i.e. first synchronizing and then measuring, the time stamping in each of the two transmitting and receiving apparatuses 1, 2 with different time offsets can be performed first and the synchronization can be carried out thereafter to correct the receiving times by the time offsets between the two transmitting and receiving apparatuses 1, 2.

Also as an alternative, the two synchronized transmitting and receiving apparatuses 1, 2 at the end of the leaky waveguide 4 can send radio signals which are received by the mobile unit 3. The mobile unit 3 then determines the receiving times in its local time and determines its own position from the difference of the receiving times according to equation (5). Such an approach is advantageous if the position is desired on the moving mobile unit 3 or if a great number of mobile units 3 are to be able to locate themselves. It is immaterial for positioning whether the two transmitting and receiving apparatuses 1, 2 at the end of the leaky waveguide 4 are highly synchronous with respect to each other and then send, or whether the signals are sent to the mobile unit 3 first and then, in a second step, time and frequency offsets of the transmitting and receiving apparatuses 1, 2 are determined and corresponding correction data is distributed for the sending times via data radio transmission.

The radio signals c of the mobile unit 3 can be of any particular nature, for example a GSM signal (GSM: Global System for Mobile Communications), UMTS (Universal Mobile Telecommunication System), Wi-Fi (Wireless Local Area Network) signals or any other signals of a radar system for local position determination in accordance with [Sym16]. The different above-mentioned signals need not be transmitted on a continuous basis. Due to the difference formation, two-way communication is not necessary for distance measurement. Due to the coupling of the signals, in particular the radio signals c in the near field of the leaky waveguide 4, broadband signal forms, in particular signal forms with bandwidths greater than 1% of the carrier frequency, are preferred in the technical implementation, to keep the effect of a frequency-dependent propagation delay behavior of the leaky waveguide 4 as small as possible.

Apart from the coupling point l1, the distance of the mobile system or the mobile unit 3 to the leaky waveguide cable 4 can also be determined. To do this, the mobile receiving station 3 is configured in such a way that it receives the synchronization signal a of the two transmitting and receiving apparatuses 1, 2 and sends its radio signal c in precise synchronization.

If different frequencies are used for cable-bound synchronization, i.e. for the synchronization signal a and the response signal b and for the radio signals c of the mobile unit 3, the radiation characteristic of the leaky waveguide 4 only has to be tuned to a signal frequency of the mobile unit 3, since the guided wave of the synchronization signal a and the response signal b need not leave the cable for synchronization purposes. By these means, the design of the leaky waveguide 4 is simplified. In the case of a conductor 7, in which the electric propagation delay, or the propagation velocity is frequency-dependent, and in which the different frequencies are used for synchronization and for propagation delay measurement, the different propagation velocities in the cable or the conductor 7, as the case may be, are taken into consideration:

$$\Delta t_{stamp} = t_{stamp1} - t_{stamp2} \quad (6)$$
$$= t_{l1} - t_{l2}$$
$$= 2t_{l1} - (c_{f12}/c_{f3})t_l,$$

wherein $c_{f12}$ is a propagation velocity within conductor 7 for a frequency for synchronization of the transmitting and receiving apparatuses 1, 2, and $c_{f3}$ is a propagation velocity of a transmitting frequency of the mobile unit 3 within the conductor 7. This results in the coupling distance $l_1$ as follows:

$$l_1 = 0.5(c_{f3}\Delta t_{stamp} + c_{f12}t_l) \quad (7)$$

Figure 3:
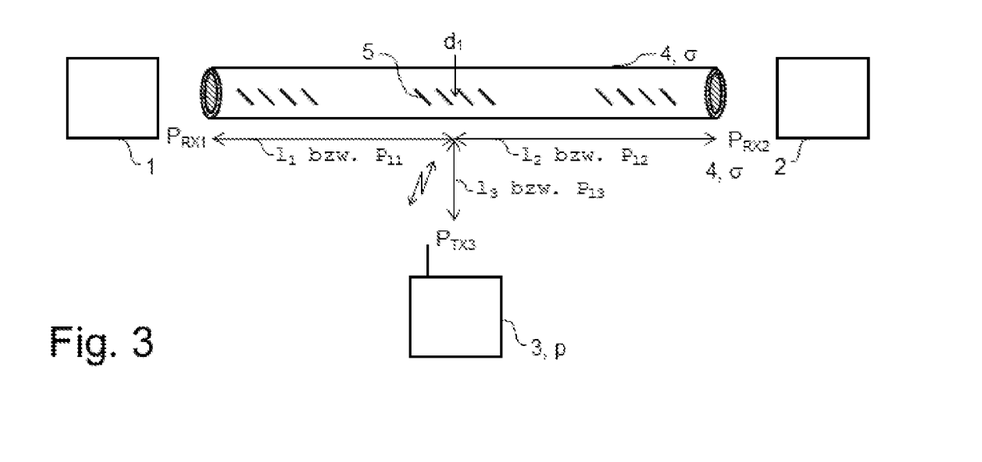
FIG. 3 shows a schematic of the power levels present in such an arrangement.

Due to the simultaneous reception and determination of the receiving time at the two transmitting and receiving apparatuses 1, 2, the amplitude of the signals sent by the mobile unit 3 and received in the two transmitting and receiving apparatuses 1, 2 can now be used to estimate a distance or a coupling distance $l_3$ of the mobile unit 3 to the cable or leaky waveguide 4, as is also illustrated in FIG. 3. Since a cable attenuation a, a coupling loss $P_{coup}$ and the coupling point and its first coupling distance $l_1$, for example, are known, the corresponding proportion of the cable attenuation a can be subtracted and thus the distance or the third coupling distance $l_3$ from the mobile unit 3 to the cable or the conductor 7 can be calculated or estimated in a first approximation by way of free-space attenuation:

$$P_{RX1} = P_{TX3} - P_{l2} - P_{l1} \quad (8)$$
$$= P_{TX3} - P_{l2} - \sigma_l - P_{coup}$$
$$P_{l2} = P_{TX2} - P_{RX1} - \sigma_2 - P_{coup}. \quad (9)$$

Wherein $P_{RX1}$ is a receiving power at the first transmitting and receiving apparatus 1, $P_{TX3}$ is a transmitting power of the mobile unit 3, $P_{l1}$ is a transmitted power from the coupling location $d_1$ to the first transmitting and receiving apparatus 1, $P_{l3}$ is a transmitted power from the coupling location $d_1$ to the mobile unit 3, and $P_{l3}$ is a power over the free-field propagation.

The free-space attenuation can be determined according to:

$$P_{l3} = (\lambda/(4\pi^* l_3))^2$$

wherein $\lambda = c_1/f$ is the wavelength of the signal, in particular the radio signal c, f is the frequency of the signal, and $c_1$ is the velocity of light.

The calculation for the second side between the mobile unit 3 and the second transmitting and receiving apparatus 2 can be performed in a corresponding manner, and the two values thus determined can be averaged to improve precision.

The coupling distance $l_3$ of the coupling location $d_1$ as seen from the mobile unit 3 can be determined from the power $P_{l3}$ via the free-field propagation as an approximation, as is known per se from text books on signal propagation, such as "Global Positioning Systems, Inertial Navigation and Integration", Grewal et al, Wisley Interscience, 2001, pp 45+46. As an alternative to the consideration of the free-space attenuation, a non-linear performance of the signal propagation within conductor 7 can be stored in a look-up table and used for computation.

In particular, from the coupling distance $l_3$ of the mobile unit 3, among other things, its position p in space relative to the leaky waveguide 4 or its coupling location $d_1$, and/or relative to one or two of the transmitting and receiving apparatuses 1, 2 can also be determined.

Moreover, the difference of the field strengths of the two sides of the transmitting and receiving apparatuses 1, 2 can also be used for plausibility testing of the measuring results propagation delay behavior.

In a further embodiment of the invention, a combination with a 4-quadrant antenna is provided, whose main radiation characteristic is always set to normal by way of phase slides. The normal is determined by way of a 3D-acceleration sensor.

Figure 4:
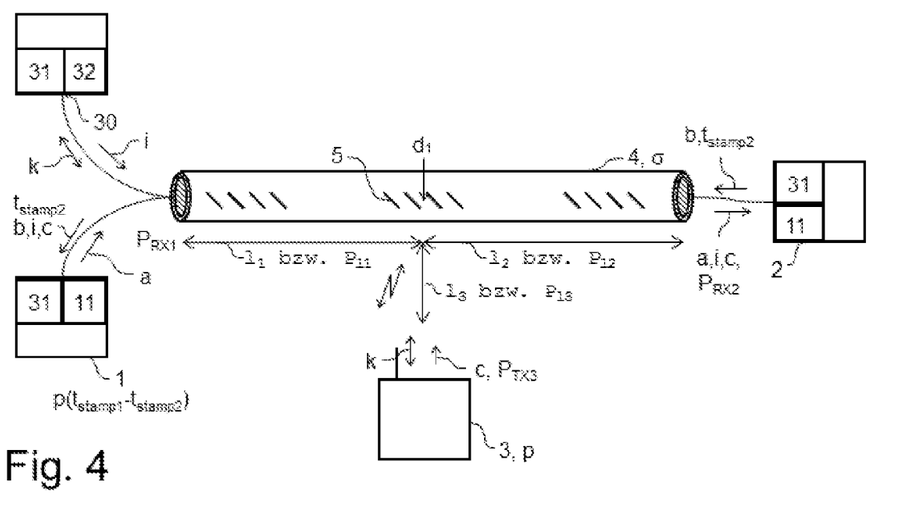
FIG. 4 shows components and signals of a further embodiment.

A further exemplary embodiment is shown in FIG. 4, wherein in the following, in particular, components and functions will be described which are not described or differently described in the other embodiments. Combinations of the different embodiments are also possible, however. The embodiments according to FIGS. 1 to 3 are particularly suitable for newly installed systems, while the embodiment according to FIG. 4 is particularly useful to retrofit existing systems.

In the figure, components of a common communication system, in particular, e.g. for mobile radio communication, comprise the leaky waveguide 4 and a communication transmitting and receiving apparatus 30. The communication transmitting and receiving apparatus 30 comprises a communication signal receiver 31 for receiving radio signals of such mobile units 3 guided via the leaky waveguide 4. Moreover, the communication transmitting and receiving apparatus 30 comprises a communication signal transmitter 32 for sending radio signals to such mobile units 3 to be guided via the leaky waveguide 4. Communication signal receiver 31 and communication signal transmitter 32 can also be formed as an integral device.

The communication transmitting and receiving apparatus 30 is arranged at one of the two ends of the leaky waveguide 4 in such a manner that an electromagnetic wave generated by the communication transmitting and receiving apparatus 30 is fed into the leaky waveguide 4 for the transmission of the communication signal k, and that an electromagnetic wave arriving through the leaky waveguide 4 as a communication signal k is received by the communication transmitting and receiving apparatus 30. Such communication signals will exit or enter the leaky waveguide 4 through slits 5 so that a communication can be set up and performed by way of the communication signals to one such mobile unit 5 via the air interface.

In addition, one of the two transmitting and receiving apparatuses 1, 2 is coupled at each end of the leaky waveguide 4, for example via an electric conductor.

The two transmitting and receiving apparatuses 1, 2 comprise transmitting and receiving devices 11 which are adapted for communication and synchronization of the two transmitting and receiving apparatuses 1, 2 among each other via the leaky waveguide 4.

The two transmitting and receiving apparatuses 1, 2 also each comprise a communication signal receiver 31 for receiving radio signals of such mobile units 3 via the leaky waveguide 4. The receiving portions of the transmitting and receiving apparatuses 1, 2 can be completely different, in particular. By these means, both can receive such radio signals c and use them for the creation of the time stamps $t_{stamp1}$, $t_{stamp2}$. After performing the synchronization and after one transmitting and receiving apparatus 1, 2 has received the time stamp $t_{stamp2}$ from the other, the location or the position $p(t_{stamp1} - t_{stamp2})$ of the mobile unit 3 can be determined in dependence on the time stamps $t_{stamp1}$, $t_{stamp2}$.

Moreover, the two transmitting and receiving apparatuses 1, 2 can use the communication signal receiver 31 or any other communication means to receive information i on such mobile units 3, in particular on currently active mobile units 3. By these means, the two transmitting and receiving apparatuses 1, 2 can selectively monitor incoming signals for such radio signals c of certain mobile units 3 to be monitored, and can perform analysis for location determining purposes in case they receive any.

Such information i can be determined by the communication transmitting and receiving apparatus 30 itself or by a different instance, for example can be provided by a maintenance center controlling the entire system or the synchronization components. The information i can be, for example, automatically determined information with respect to mobile units currently logged-in in the communication system. The information i can also be indirectly determined information, for example, on workers working in a tunnel, which are uniquely associated with a mobile unit 3 and which have logged-in by way of a personnel time tracking system as they entered the tunnel, wherein the personnel time tracking data can be called up from a table together with the data of the mobile unit 3.

In particular, if in the transmitting and receiving apparatuses 1, 2, the transmitting and receiving device 11 and the communication signal receiver 31 are configured as separate components or functions, different frequencies, which do not interfere with each other, can be used for synchronizing the transmitting and receiving apparatuses 1, 2 with each other on the one hand, and for location determining such mobile units 3 on the other. For example, synchronizing the transmitting and receiving apparatuses 1, 2 is then also carried out via the leaky waveguide, but in a different frequency range than a leaky waveguide radiation frequency. Advantageously, synchronization and location can be performed simultaneously, parallel with each other and independently from each other. Such de-coupling of the functions can also be achieved, however, by other means, for example by using different time slots or time periods for synchronization and location. Further advantages are, amongst others, retrofitting capability and that there is no radiation of the synchronization signals.

For example, a communication between the communication transmitting and receiving apparatus 30 and the mobile unit 3, known per se from mobile radio communication, can be performed. For example, when different signals, frequency ranges or time slots are used, for example, on the one hand for communication and on the other for synchronization, the communication can be carried out without any limitation with respect to other systems and also the location determining process can be carried out side by side and independently from each other.

In the transmitting and receiving apparatuses 1, 2, the transmitting and receiving devices 11 and the communication signal receiver 31 can also be provided as a common device or a common function, as can be realized, in particular, for the embodiments according to FIG. 1. This applies in particular, if common frequency ranges are used for synchronization and the radio signals.

A great number of combinations of the different described embodiment features are possible. Further modifications are also possible. Apart from the exemplary synchronization of the transmitting and receiving apparatuses 1, 2 with a different frequency range from the leaky waveguide radiation frequency, other differentiation mechanisms could also be used in each of the embodiments, as far as desired. For example, all sending devices could use the same or a similar sending signal, in which, for example, the same modulation is used.

To simplify the structure, one of the transmitting and receiving apparatuses 1, 2 could also take over the function of the communication transmitting and receiving apparatus 30.

From the basic principle, the different sending devices could send with any signal form and at any frequency.

The mobile unit 3 can send a known data sequence, in particular an identification, to be identified by the transmitting and receiving apparatuses 1, 2. For this purpose, the mobile unit 3 could also use predetermined time slots, frequencies, frequency sequences, for example, such as a frequency modulated continuous wave (FMCW), for example, also as previously communicated by the transmitting and receiving apparatuses 1, 2, or could use different modulation forms. Separating the received signals is thus possible in a simple manner by way of electronic processing, such as by way of a bandpass filter.

The transmitting and receiving apparatuses 1, 2 only need to receive a radio signal c from the mobile unit 3, as far as the basic principle is concerned, and be able to identify the receiving time. In particular, correlation should be possible with a portion of the identified signal, to increase the precision of the timing information and the time stamps to be created. If, however, the location determination is not to be very precise, it may be sufficient if the transmitting and receiving apparatuses 1, 2 are only able to identify the existence of an incoming radio signal c, but cannot otherwise identify its data contents.

The transmitting and receiving apparatuses 1, 2 can correlate with any signals, in particular, for which purpose a second receiving unit may be provided in the transmitting and receiving apparatuses 1, 2, as the case may be. Instead of or in addition to a generally performable correlation, downmixing and spectral analysis could also be performed, which works well with FMCW signals.

For example, an existing communication system can thus be complemented by location determining components or functions, wherein the complemented second units can be operated with the same system clock. For many modern systems, a clock of 100 ps is sufficient, for example, since the signals pass through the leaky waveguide with a location determining precision of 2 m, and thus less reflections arrive and less multi-path interference has to be considered than otherwise for typical location determining systems, such as [Sym06] or [Sym16] in large hangers or in wide open spaces.

LIST OF REFERENCE NUMERALS

1 first transmitting and receiving apparatus
2 second transmitting and receiving apparatus
3 mobile unit
4 waveguide, in particular leaky waveguide 4
5 slits
6 shielding
7 conductor
11 transmitting and receiving devices in 1, 2
30 communication transmitting and receiving apparatus
31 communication signal receiver
32 communication signal transmitter
a synchronization signal
b response signal
c radio signal
$c_{cable}$ propagation velocity of the signal in the conductor
$c_{f12}$ propagation velocity of the synchronization frequency
$c_{f3}$ propagation velocity of the transmitting frequency of the mobile unit
$d_1$ coupling location of the mobile unit
e time stamp exchange
i information with respect to active mobile units
k communication signal
$l_1, t_1$ coupling distance/propagation delay from $d_1$ to 1
$l_2, t_2$ coupling distance/propagation delay from $d_1$ to 2
$l_3, t_3$ coupling distance/propagation delay from $d_1$ to 3
P position of the mobile unit 3 to $d_1$, 1 and/or 2
$P_{11}$ transmitted power from $d_1$ to 1
$P_{13}$ transmitted power from $d_1$ to 3
$P_{13}$ power via free-field propagation
$P_{coup}$ coupling loss
$P_{RX1}$ receiving power at 1
$P_{TX3}$ transmitting power of the mobile unit 3
$t_{l1}$ signal propagation delay through leaky waveguide
$t_{l1}$ propagation delay between 1 and $d_1$
$t_{l2}$ propagation delay between 2 and $d_1$
$t_{l3}$ propagation delay between 3 and $d_1$
$t_{start}$ starting time
$t_{stamp1}$ time stamp as receiving time at 1
$t_{stamp2}$ time stamp as receiving time at 2
$\Delta d$ location determining precision
$\Delta f$ band width of radio signal c
$\Delta t$ propagation delay precision
$\Delta t_{stamp}$ difference of the two receiving times
$\sigma$ cable attenuation

The invention claimed is:

1. A method for locating a current position or a coupling location of a mobile unit at least able to send or receive for location determining purposes, by way of a leaky waveguide, wherein:
at least one radio signal is transmittable from the mobile unit into the leaky waveguide or from the leaky waveguide to the mobile unit through leaky portions of the leaky waveguide,
the radio signal is sent by the mobile unit via at least one leaky portion of the leaky portions and received by two transmitting and receiving apparatuses, or such a radio signal is sent by each of two transmitting and receiving apparatuses and received by the mobile unit via the at least one leaky portion, and
a receiving time is determined for each of the received radio signals, and
from two such receiving times the current position or the coupling location is determined,
wherein prior to the determination of the current position or the coupling location or prior to receiving the radio signal or prior to sending the radio signal, the transmitting and receiving apparatuses located at the opposite ends of the leaky waveguide are synchronized with each other.

2. The method according to claim 1, wherein
for synchronizing of at least two of the transmitting and receiving apparatuses, which each have an own clock device, one of the transmitting and receiving apparatuses is determined as transmitter station and the other, to be synchronized with a former, is determined as receiver station,
for synchronizing the clock devices and thus the transmitting and receiving apparatuses to be synchronized,
the transmitter station sends at least a narrow-band pre-signal through, in particular, the leaky waveguide, clock devices of receiving units of the receiver station are pre-synchronized with the source of the pre-signal by coupling onto such pre-signal,
after a specific waiting period, the transmitter station sends a broadband measuring signal through, in particular, the leaky waveguide, and the receiving units receive this signal, the receiving units correlate the broadband measuring signal with a comparison signal modulated in the same way, and
based on the correlation result, the receiving time of the broadband measuring signal is determined and the deviation of the synchronization of the clock devices is determined and compensated.

3. The method according to claim 1, wherein
for synchronizing, one of the transmitting and receiving apparatuses is determined as transmitter station and the other as receiver station to be synchronized therewith,
wherein, in the transmitter station, a transmission signal is generated by a signal source and is sent through, in particular, the leaky waveguide, and a corresponding receiving signal is received in the receiver station by, in particular, the leaky waveguide and evaluated by a receiver-side signal source adapted to the transmitter-side signal source by using a receiver signal-source signal in the receiver station,
a similar frequency modulation is applied to both the transmission signal and the receiver signal-source signal,
the receiving signal received in the receiver station is correlated, or is mixed with the receive signal-source signal to create a mixed signal and the mixed signal is spectrally analyzed.

4. The method according to claim 1, wherein the same or similar transmission signals are used, on the one hand for the synchronization of the transmitting and receiving apparatuses and, on the other hand, for at least one of location determining and for the communication of the mobile unit.

5. The method according to claim 1, wherein for synchronizing the two transmitting and receiving apparatuses with each other, synchronization signals in a different frequency range—in particular in a non-overlapping frequency range—are sent through the leaky waveguide, as a frequency range in which communication signals are sent through the leaky waveguide.

6. The method according to claim 1, wherein an air gap to the coupling location is determined as a coupling distance by way of a propagation delay between the coupling location and the current position of the mobile unit.

7. The method according to claim 1, wherein the radio signal is identifiable, in particular, uses, in a predeterminable or predetermined way, a data sequence, an identification, a time slot, a frequency, a frequency sequence, a continuous wave with frequency width or modulation or a modulation scheme.

8. The method according to claim 1, wherein information on active or detectable such mobile units is transmitted to the transmitting and receiving apparatuses, in particular through the leaky waveguide.

9. A transmitting and receiving apparatus for performing a method according to claim 1 or for operating a system comprising
at least one of components and functions for synchronizing one of the transmitting and receiving apparatus with another such transmitting and receiving apparatus or for synchronizing with another such transmitting and receiving apparatus, and
at least one of components and functions for sending or receiving a radio signal through a leaky waveguide for determining the location of a mobile unit.

10. A mobile unit for performing a method according to claim 1 or for operating a system which is provided with at least one of components and functions for sending or receiving a radio signal independent from communication signals for locating their current positions or a coupling location of their signals into the leaky waveguide.

11. A system for locating a current position or a coupling location of at least one mobile unit present in the system or able to be introduced into the system, by way of a leaky waveguide, wherein such mobile units are at least able to transmit or receive for location determining purposes, and wherein the system comprises:
one said leaky waveguide into which at least one radio signal is transmittable from one said mobile unit, or from which at least one radio signal is transmittable to such a mobile unit, through leaky portions of the leaky waveguide,
two transmitting and receiving apparatuses arranged at opposite ends of the leaky waveguide for receiving or transmitting one said radio signal,
wherein the radio signal is able to be sent by the mobile unit via at least one leaky portion of the leaky portions and able to be received by the two transmitting and receiving apparatuses, or such a radio signal is able to be transmitted by each of the two transmitting and receiving apparatuses and able to be received by the mobile unit via the at least one leaky portion, and
a receiving time is able to be determined for each of the radio signals received in such manner, and
from two such receiving times the current position or the coupling location is able to be determined,
wherein prior to the determination of the current position or the coupling location or prior to receiving the radio signal or prior to sending the radio signal, the transmitting and receiving apparatuses are synchronized with each other,
and wherein the system is provided with components for performing a method for locating the current position or the coupling location of such a mobile unit.

12. The system according to claim 11, wherein receiving devices are arranged differently, on the one hand for synchronizing the transmitting and receiving apparatuses and, on the other hand, for at least one of location determining and for the communication of the mobile unit, in particular arranged differently with respect to their functionality.

13. The system according to claim 11, wherein one of the transmitting and receiving apparatuses takes over a communication function for the coordination of location determining method steps.

14. The system according to claim 11, wherein a communication system is complemented by location determining components or location determining functions, wherein the transmitting and receiving apparatuses and at least one of the mobile unit and a communication transmitting and receiving apparatus of the communication system are operated with the same system clock, or are operated with almost the same system clock within a tolerance value.

15. The system according to claim 11, wherein
connecting elements independent from the leaky waveguide are installed for transmitting synchronization signals between the transmitting and receiving apparatuses.

* * * * *